US012671288B2

(12) United States Patent
Chang et al.

(10) Patent No.: US 12,671,288 B2
(45) Date of Patent: Jun. 30, 2026

(54) ROTOR STRUCTURE

(71) Applicant: FUKUTA ELECTRIC & MACHINERY CO., LTD., Tongluo Township, Miaoli County (TW)

(72) Inventors: Chin-Feng Chang, Tongluo Township, Miaoli County (TW); Chih-Meng Chu, Tongluo Township, Miaoli County (TW); Chen-Hui Chang, Tongluo Township, Miaoli County (TW); Chien-Hsun Chen, Tongluo Township, Miaoli County (TW)

(73) Assignee: FUKUTA ELECTRIC & MACHINERY CO., LTD., Tongluo Township (TW)

( * ) Notice: Subject to any disclaimer, the term of this patent is extended or adjusted under 35 U.S.C. 154(b) by 265 days.

(21) Appl. No.: 18/438,832

(22) Filed: Feb. 12, 2024

(65) Prior Publication Data

US 2025/0260282 A1     Aug. 14, 2025

(51) Int. Cl.
H02K 1/32          (2006.01)
H02K 7/00          (2006.01)

(52) U.S. Cl.
CPC .............. H02K 1/32 (2013.01); H02K 7/003 (2013.01)

(58) Field of Classification Search
CPC ................................. H02K 1/32; H02K 7/003
USPC ........................................................... 310/54
See application file for complete search history.

(56) References Cited

U.S. PATENT DOCUMENTS

| | | | | |
|---|---|---|---|---|
| 8,916,997 | B2 * | 12/2014 | Kirkley, Jr. ............ | H02K 5/203 |
| | | | | 310/90 |
| 9,917,486 | B2 * | 3/2018 | Kirkley, Jr. .............. | H02K 1/32 |
| 11,056,950 | B2 * | 7/2021 | Jung ........................ | H02K 1/32 |
| 11,398,756 | B2 * | 7/2022 | Fujii ...................... | H02K 1/276 |
| 11,418,076 | B2 * | 8/2022 | Tang ................... | H02K 1/2766 |
| 11,848,585 | B2 * | 12/2023 | Choi ........................ | H02K 5/20 |
| 2013/0221772 | A1 * | 8/2013 | Miyamoto ............... | H02K 9/19 |
| | | | | 310/54 |
| 2013/0334912 | A1 * | 12/2013 | Tokunaga ................ | H02K 9/19 |
| | | | | 310/54 |
| 2015/0280525 | A1 * | 10/2015 | Rippel ..................... | H02K 9/24 |
| | | | | 310/54 |
| 2016/0043620 | A1 * | 2/2016 | Li .......................... | H02K 21/14 |
| | | | | 310/156.01 |
| 2019/0393747 | A1 * | 12/2019 | Tang ........................ | H02K 5/20 |

(Continued)

*Primary Examiner* — Alex W Mok
(74) *Attorney, Agent, or Firm* — MUNCY, GEISSLER, OLDS & LOWE, P.C.

(57)          ABSTRACT

A rotor structure comprises core laminations, two ring covers, and a hollow shaft. The core laminations have a horizontal side with multiple equally angled lightening holes. Each ring cover has a horizontal inner surface that contacts the outermost horizontal side of the core lamination. The horizontal inner surface of the ring covers features guiding protrusions corresponding to the lightening holes. The guiding protrusions form grooves at their end surfaces that serve as oil inlets and outlets located along the inner and outer circumferential surfaces of the ring covers, respectively. The core laminations and the ring covers are mounted on the hollow shaft, and the oil inlet of the ring cover is fluidly connected to the oil injection hole of the hollow shaft. The guiding protrusions can slow down the flow velocity centrifugally to ensure the consistency of the oil inlet and outlet.

7 Claims, 7 Drawing Sheets

(56)　　　　　　　References Cited

U.S. PATENT DOCUMENTS

| | | | |
|---|---|---|---|
| 2020/0036248 A1* | 1/2020 | Krais | H02K 1/30 |
| 2020/0204044 A1* | 6/2020 | Lee | H02K 1/20 |
| 2020/0244124 A1* | 7/2020 | Kang | H02K 1/32 |
| 2020/0295626 A1* | 9/2020 | Yuan | H02K 1/2766 |
| 2021/0066980 A1* | 3/2021 | Fujii | H02K 1/276 |
| 2021/0384801 A1* | 12/2021 | Oh | H02K 1/276 |
| 2022/0029485 A1* | 1/2022 | Yang | H01F 1/147 |
| 2022/0294294 A1* | 9/2022 | Choi | H02K 9/19 |

* cited by examiner

ROTOR STRUCTURE

FIELD OF INVENTION

The present disclosure relates to a rotor structure, in particular a rotor structure with channel configurations capable of improving the temperature distribution on both side surfaces.

BACKGROUND OF THE INVENTION

During high-speed rotation, electric motor rotors generate high temperatures that require the incorporation of cooling oil passages for heat dissipation. One configuration of rotor oil passages involves injecting cooling fluid into the hollow shaft of the rotor. The rotor core is perforated with multiple holes to form axial cooling oil passages, or tubes are equipped within the holes to form the axial cooling oil passages, which have oil inlets connected to the hollow shaft and oil outlets located at the outermost core (or ring covers on both sides). Wherein the internal oil passages within the core can be positioned at any position, such as near the periphery of the permanent magnets within the core, or allowing the cooling oil to directly contact the permanent magnets.

Utilizing the centrifugal force of the rotor, cooling fluid radially introduced into the core from the axis and then radially guided out from both sides of the core to the oil outlets. However, if there are tolerances in the assembly between the cores or discrepancies between the core and the two ring covers due to material differences, gaps may exist between the mating surfaces of the core and the core, or the core and the ring covers. Under the inertial effect during rotation, fluid expelled from the hollow shaft to the core will be thrown tangentially, flows out through the gaps between the mating surfaces, and does not effectively enter the interior of the rotor. This means that the amount of oil in multiple axial flow channels is not uniform at the same time. Furthermore, incomplete entry of the cooling fluid into the oil passages leads to uneven distribution of the internal oil, causing variations in flow velocities between different flow channels within the rotor, which affects the heat exchange rates, especially the temperature distribution at the two ring covers.

SUMMARY OF THE INVENTION

To address the foregoing shortcomings, the present disclosure provides a rotor structure comprising at least one core lamination, two ring covers, and a hollow shaft. The core lamination has a horizontal side with multiple perforations consisting primarily of multiple lightening holes and multiple magnet mounting holes. Each contour of the lightening holes is identical, equidistant from a center, and arranged at equal angles. The ring cover has a horizontal inner surface that contacts the outermost horizontal side of the core lamination. The horizontal inner surface has multiple guiding protrusions that correspond to the lightening holes one at a time with an end surface forming one portion of a groove. Some of the grooves have the other portion forming a channel inlet located on an inner circumferential surface of the ring covers, while the other portion of the other grooves forming a channel outlet located on an outer circumferential surface of the ring covers. The channel inlet and outlet are staggered around the circumferential direction. The core lamination and two ring covers are mounted on the outside of the hollow shaft, and the channel inlet of the ring cover is fluidly connected to an oil injection hole of the hollow shaft. The guiding protrusions enter the inside of the lightening holes with respect to the horizontal inner surface.

The guiding protrusions serve to block the cooling fluid leakage from the mating surfaces and reduce the flow velocity of the cooling fluid entering the core lamination channels from both sides of the ring cover, thereby increasing the time the cooling fluid stays with the shaft for effective heat exchange.

Preferably, the interior of the hollow shaft is provided with an oil duct having multiple oil guide holes distributed along the axial direction, thereby providing directionality to the cooling fluid within the hollow shaft and limiting the flow rate.

Preferably, the junction between the side surface and the end surface of the guide protrusions is formed with a rounded chamfer to facilitate smooth flow of the cooling fluid from the core to the ring cover along the junction.

Preferably, the outer contour of the guiding protrusions is spaced from the contour of the lightening holes. In this way, the guiding protrusions further have the effect of directing the leaking cooling fluid into axial cooling flow channels to stabilize the internal oil level.

Preferably, the other portion of the grooves forms a radial groove relative to the horizontal inner surface to maintain a stable flow velocity.

Preferably, the junction between the radial groove and the grooves formed on the guiding protrusions is an arcuate groove, which further slows down the flow velocity of the cooling fluid entering or leaving the radial groove.

Preferably, a portion of the side surface of the guiding protrusions facing the hollow shaft has an arc extending in the circumferential direction, thereby minimizing the dispersion of the cooling fluid to the outside of the flow channels.

Preferably, the number of the core laminations is multiple and offset along the circumferential direction.

DETAILED DESCRIPTION OF THE PREFERRED EMBODIMENTS

Figure 1:
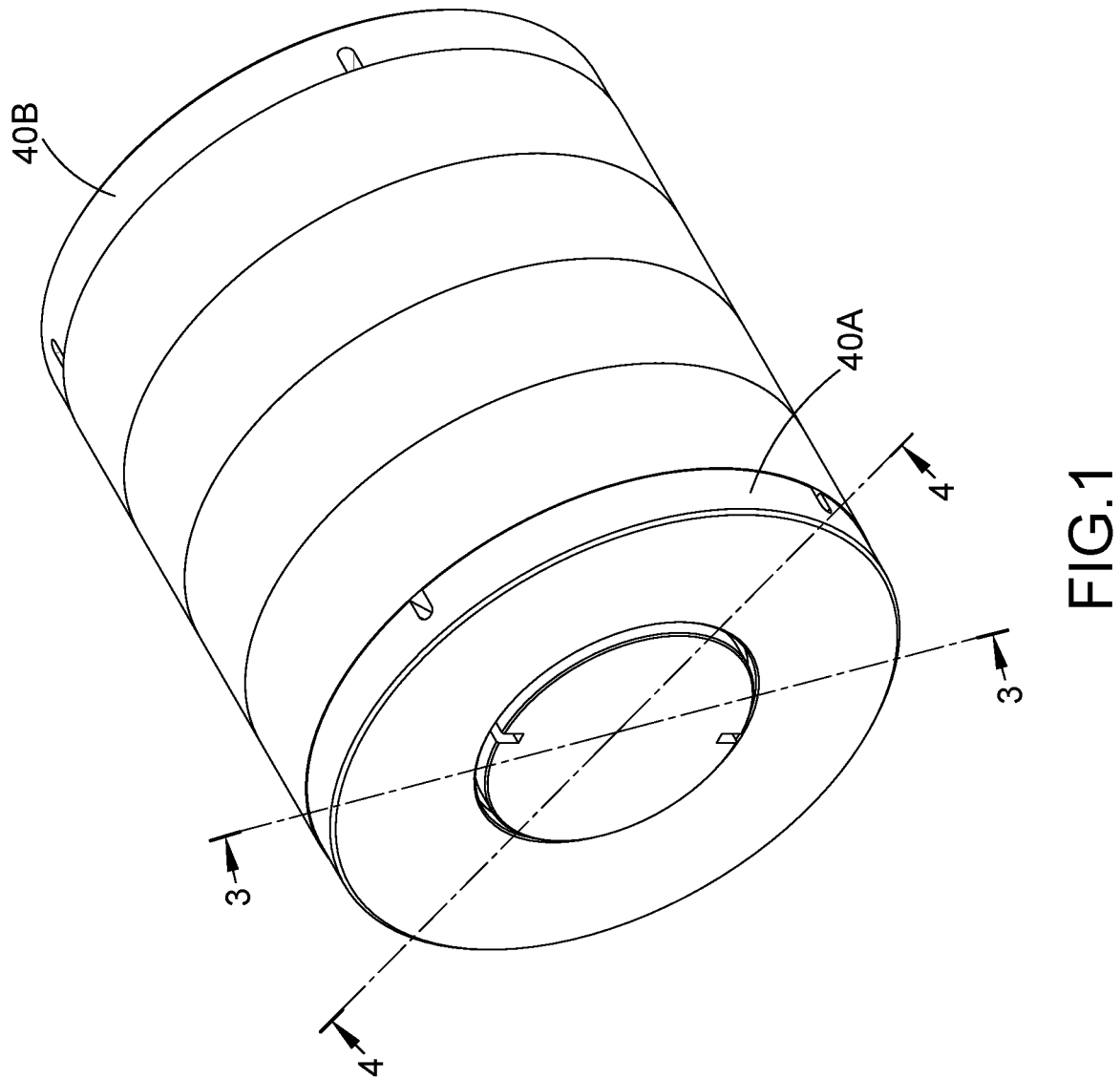
FIG. 1 is a schematic diagram of the rotor structure.

Refer to FIGS. 1 through 7 for an illustration of the internal structure of the rotor. The rotor structure comprises a rotor core 20, ring covers 40A, 40B, and a hollow shaft 50. The rotor core 20 includes at least one core lamination 21. The hollow shaft 50 has an outwardly expanded base 55 on one side and an outer circumferential surface 56.

The ring cover 40A, the rotor core 20, and the ring cover 40B are sequentially mounted on the outer circumferential surface 56 of the hollow shaft 50. The inner circumferential surface of the ring cover 40A is confined at an inner side of the base 55. The outer circumferential surface 56 matches the inner circumferential surface of the core lamination 21, thereby allowing the core lamination 21 to rotate synchronously with the hollow shaft 50. The matching structure may include, for example, positioning the inner circumferential surface of the core lamination 21 with convex rails 215 to fit into corresponding axial grooves 561 of the outer circumferential surface 56 to aid in alignment. An end locking fixture 10 is locked from the other side of the hollow shaft 50 to clamp the ring cover 40B, thereby forming a cooling oil passage within the rotor.

The core lamination 21 has horizontal and parallel core faces 211, 212 on both sides with multiple perforations penetrating the core faces 211, 212. The perforations include multiple lightening holes 23 and multiple magnet mounting holes 24. Each lightening hole 23 has the same contour, is equidistant from a center, and is arranged at equal angles. In addition to reducing the weight of the rotor, the lightening holes 23 also define axial flow channels within the core. In contrast to the lightening holes 23, the multiple magnet mounting holes 24 are located away from the center and are used to accommodate permanent magnets 30.

In contrast to creating the separate lightening holes (forming hollow passages) and flow channel holes (forming flow channels) within the core, in this embodiment the lightening holes are used directly to form the flow channels. This increases the size of the lightening hole flow channels and oil storage, reduces the flow rate of the cooling fluid at the same injection rate, and facilitates efficient heat exchange within the core. In a preferred embodiment, the lightening holes 23 are placed as close as possible to the magnet mounting holes 24, allowing the cooling fluid to carry away the high temperature of the permanent magnets 30.

In comparison to the prior art, although the flow channel holes connected to the magnet mounting holes are provided around the magnet mounting holes, allowing direct contact of the cooling fluid with the permanent magnets, which also allows the temperature to be cooled. However, if these flow channel holes are too small, excessive flow resistance will result. At the junction of the radial and axial flow channels, it is difficult for the cooling fluid to enter or exit the small-sized flow channel holes only by the centrifugal force during rotation. The overall flow velocity of the cooling oil passages is also uneven, which affects the overall temperature distribution of the rotor. In the prior art, if there are gaps in the mating surfaces of adjacent components, the actual amount of the cooling fluid entering the cooling oil passages may be much less. This reduced amount may only occur when the rotor is stationary and the cooling fluid cannot immediately flow out of the oil outlets on both sides of the core, causing the cooling fluid to pool and then enter the oil inlets of the core. Therefore, if the cooling fluid flow is not continuous during operation, the heat exchange efficiency will be limited.

In this embodiment, the structures of the ring covers 40A and 40B are identical. Taking ring cover 40A as an example, it has a horizontal inner surface 401 and an outer surface 402. The inner surface 401 contacts the outermost core face 212 of the rotor core 20, while the outer surface 402 is placed away from the rotor core 20 and faces outwardly. The horizontal inner surface 401 of the ring cover 40A has multiple guiding protrusions 41, which correspond in number and location to the multiple lightening holes 23. When the rotor assembly is completed, the guiding protrusions 41 enter the interior of the lightening holes 23 relative to the horizontal inner surface 401. This means that the guiding protrusions 41 are located inside of an inner circumferential wall 231 formed in the lightening holes 23 of the core lamination 21, thereby enabling synchronous rotation of the ring cover 40A with the core lamination 21 (the hollow shaft 50).

Each of the guiding protrusions 41 has a side surface 411 and an end surface 412. Some of the guiding protrusions 41 form a portion of an inlet groove 451, while others form a portion of an outlet groove 452. The inlet groove 451 is recessed along the end surface 412 and the side surface 411 of the guiding protrusion 41 to form a turning flow channel extending along the side surface 411 of the guiding protrusion 41 toward the axis and forming a straight radial groove 461 in the inner surface 401 of the ring cover 40A, then a channel inlet 45A is formed on an inner circumferential surface 403 of the ring cover 40A. The outlet groove 452 is recessed along the end surface 412 and the side surface 411 of the guiding protrusion 41 to form a turning flow channel extending along the side surface 411 of the guiding protrusion 41 toward the outside and forming a straight radial groove 462 in the inner surface 401 of the ring cover 40A, then a channel outlet 45B is formed on an outer circumferential surface 404 of the ring cover 40A.

Overall, the direction of the cooling oil passage in this embodiment is as follows: the rotor cooling fluid is injected from the axis of the hollow shaft 50, flows into the channel inlet 45A of the ring cover 40A (40B) through oil injection holes 511, 512 on both sides of the hollow shaft 50, then enters the interior of the rotor core 20, and finally guides out to the outside of the rotor through the channel outlet 45B of the other ring cover 40B (40A).

Figure 3:
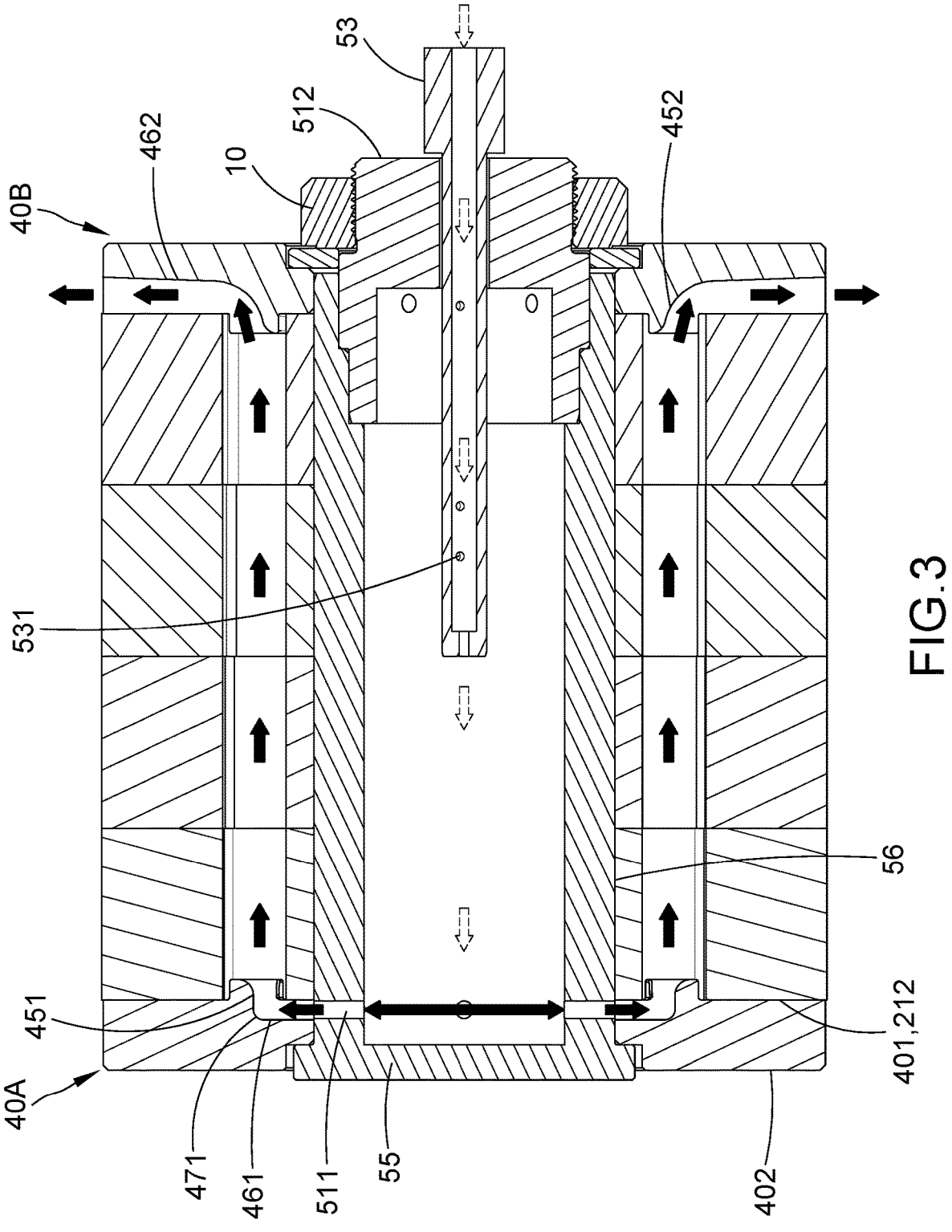
FIGS. 3 and 4 are schematic diagrams of the cooling oil passages.
Figure 4:
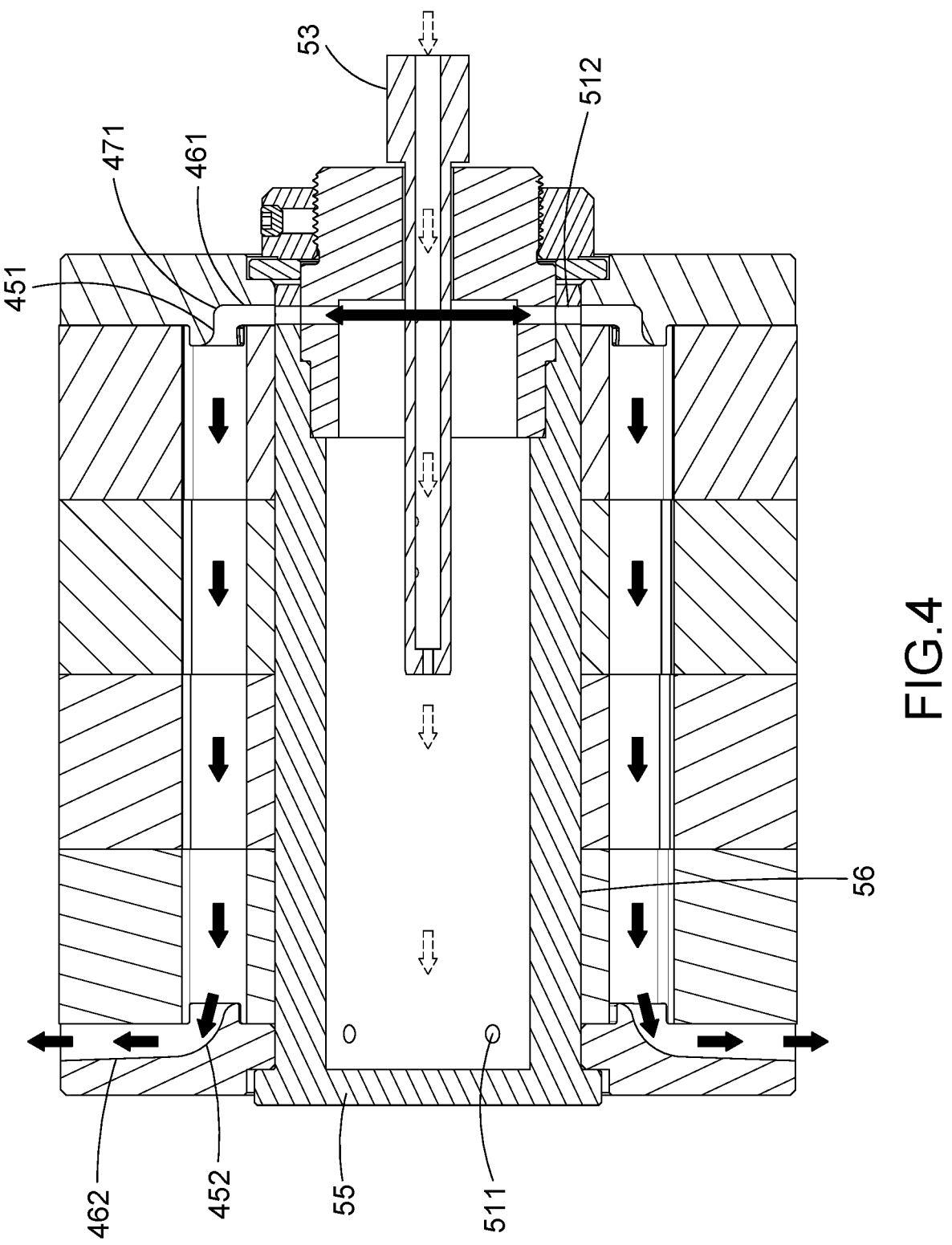
Figure 6:
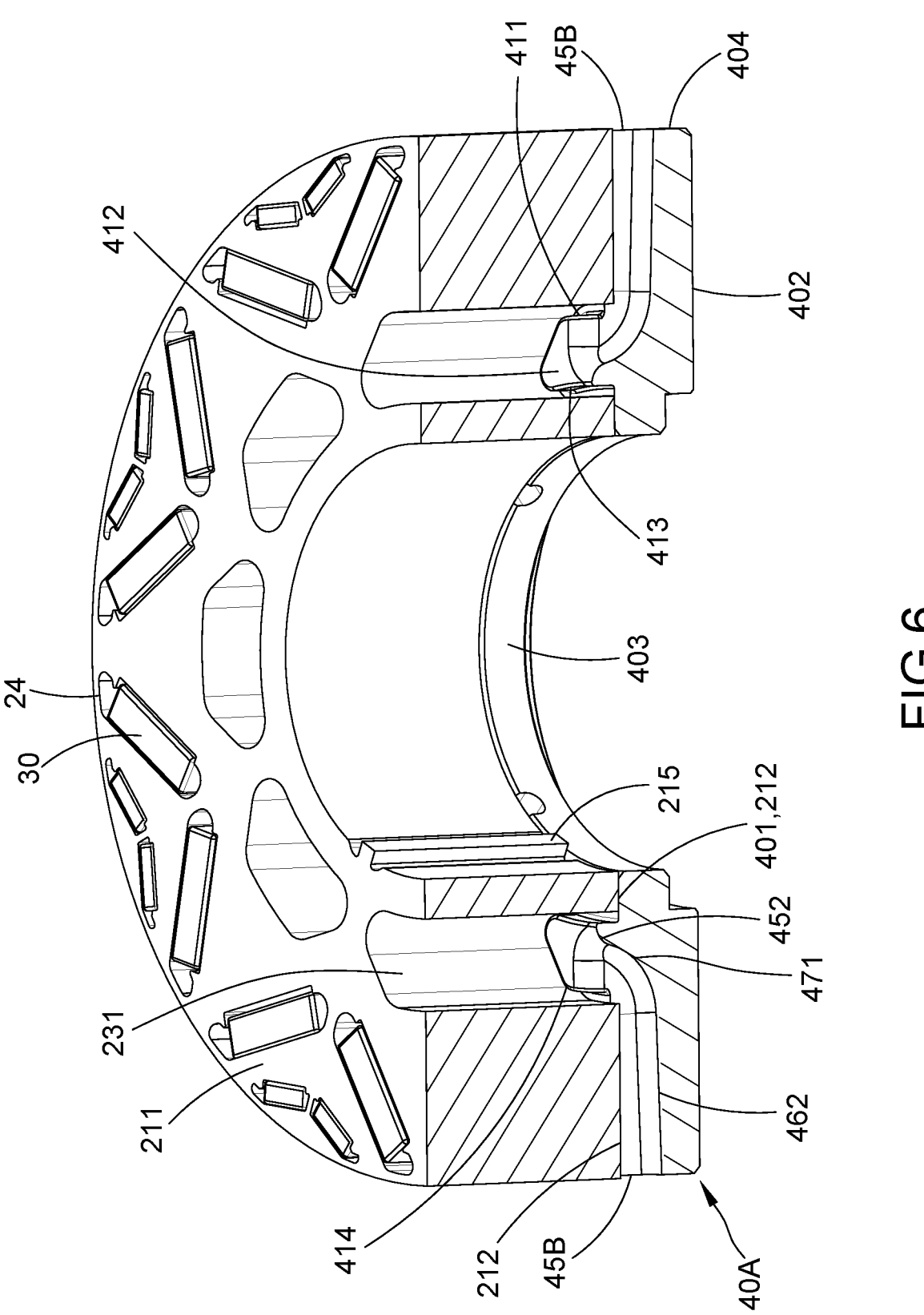
FIG. 6 is a schematic diagram of the cooling oil passage in the outlet groove.
Figure 7:
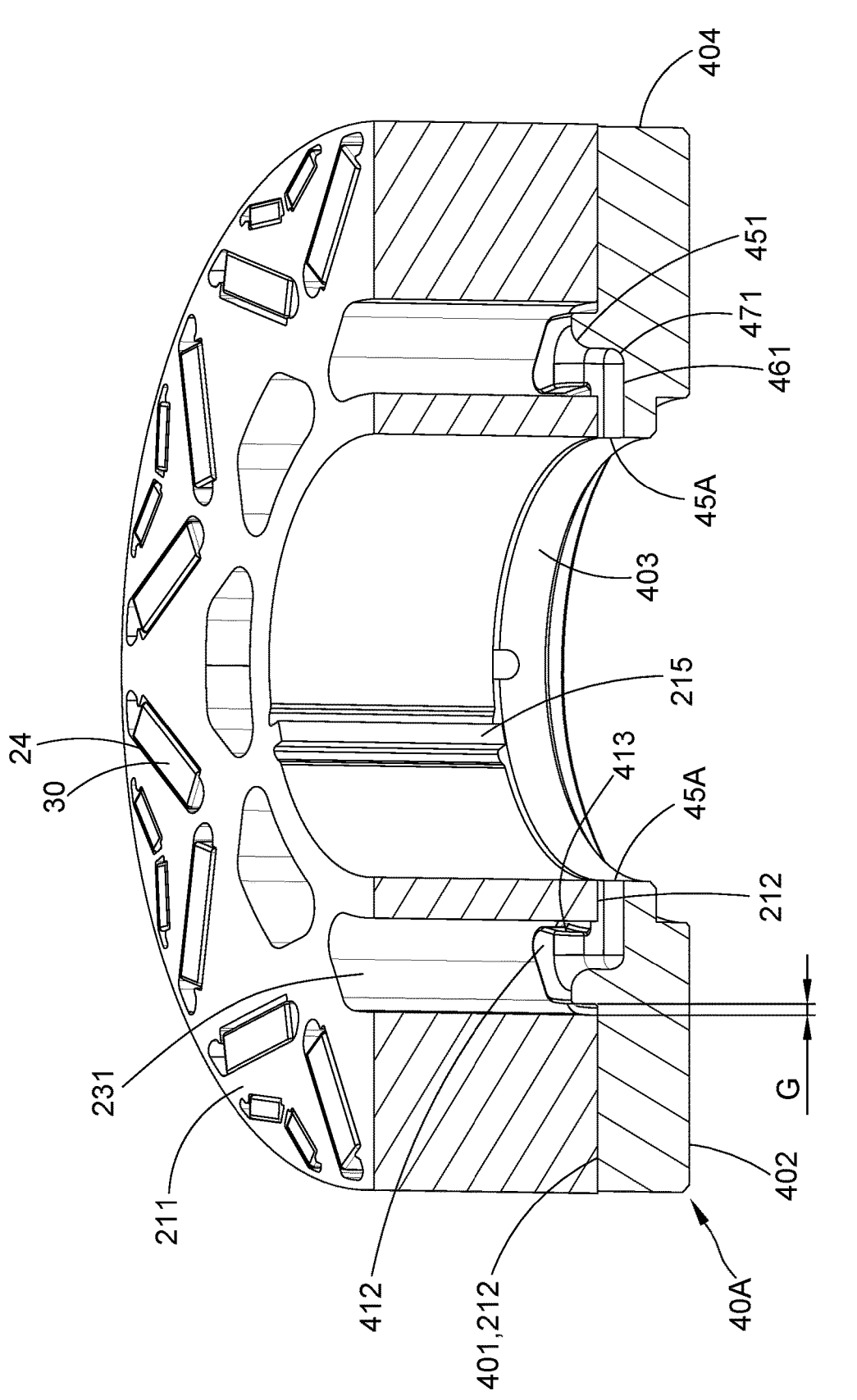
FIG. 7 is a schematic diagram of the cooling oil passage in the inlet groove.

Refer to FIGS. 6 and 7, the same is done using the ring cover 40A as an example. When the side surface 411 of the ring cover 40A contacts the outermost core face 212, the inlet groove 451, the outlet groove 452, and the radial grooves 461, 462 are closed. Only the channel inlet 45A of the inner circumferential surface 403 and the oil injection hole 511 (as shown in FIG. 3) are aligned, and the channel outlet 45B of the outer surface 402 faces outward. The channel inlet 45A and the channel outlet 45B of the ring cover 40A are staggered along the circumferential direction. The channel inlet 45A of the ring cover 40A and the channel outlet 45B of the ring cover 40B are fluidly connected to the same axial cooling oil passage, and the channel inlet 45A of the ring cover 40B and the channel outlet 45B of the ring cover 40A are fluidly connected to the same axial cooling oil passage. Wherein the channel inlet 45A of the ring cover 40A is aligned with the oil injection hole 511, and the channel inlet 45A of the ring cover 40B is aligned with the oil injection hole 512 (as shown in FIG. 3), thereby allowing the flow directions of adjacent flow channels along the circumferential direction of the rotor core 20 to be staggered to ensure a more uniform temperature distribution of the entire rotor core 20.

Apart from the inlet groove 451 and the outlet groove 452 formed on the surface of the guiding protrusion 41, the multiple guiding protrusions 41 projected on the horizontal inner surface 401 are arranged at equal angles along the circumference, and the remaining surfaces (the side surface 411) of the guiding protrusion 41 can block the cooling fluid from infiltrating the horizontal mating surfaces 401, 212 between the core lamination 21 and the ring cover 40A, thereby reducing the dispersion of the cooling fluid to the outside of the flow channels. The cooling fluid can only accumulate on the horizontal mating surface in front of the side surface 411, making it easier for the cooling fluid to enter the channel inlet 45A and stabilize the internal oil level.

Furthermore, according to the Bernoulli principle, velocity is inversely proportional to pressure. When high-speed fluid hits the side surface 411 of the guiding protrusion 41 of the ring cover 40A or the inlet groove 451 during rotor rotation, the instantaneous speed of the fluid decreases, which increases the pressure of the fluid. This increased pressure prolongs the time that the fluid remains near the axis, which greatly increases the heat exchange with the axis, thereby maintaining a stable oil level in the flow channels.

Figure 5:
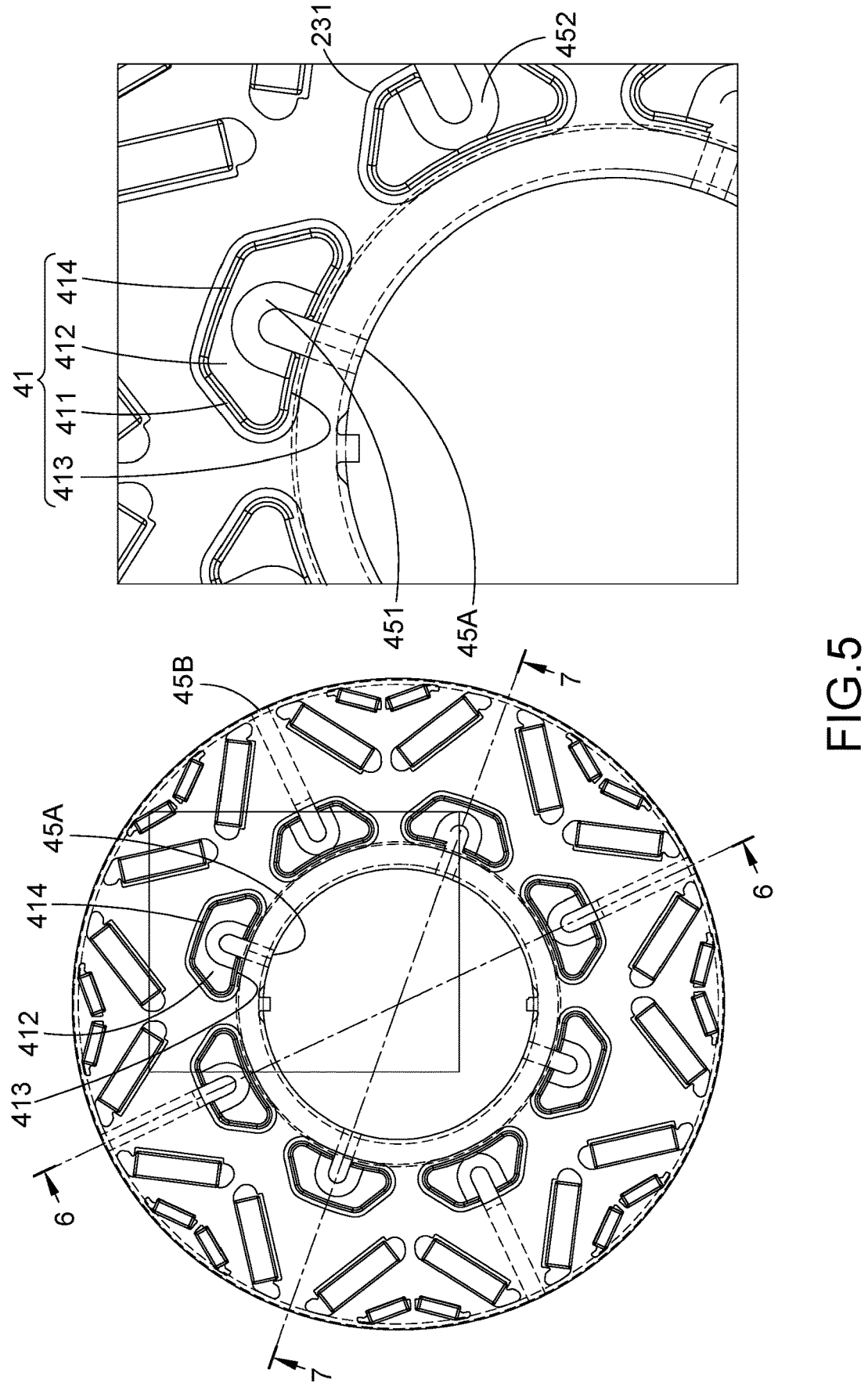
FIG. 5 is a schematic diagram of part of one side of the rotor core and the ring cover.

Refer to FIG. 5. In addition to the above structure, in a preferred embodiment, the contour of the guiding protrusion 41 corresponds to the contour of the lightening hole 23. A portion of the side surface 411 of the guiding protrusion 41 facing the hollow shaft 50 has an arc 413 distributed in the circumferential direction, which can minimize the dispersion of the cooling fluid to the outside of the flow channel as much as possible. The corresponding contour refers to the contour and size of the guiding protrusion 41 being exactly the same as the contour and size of the lightening hole 23, or the contour shapes being the same but with different sizes.

Figure 2:
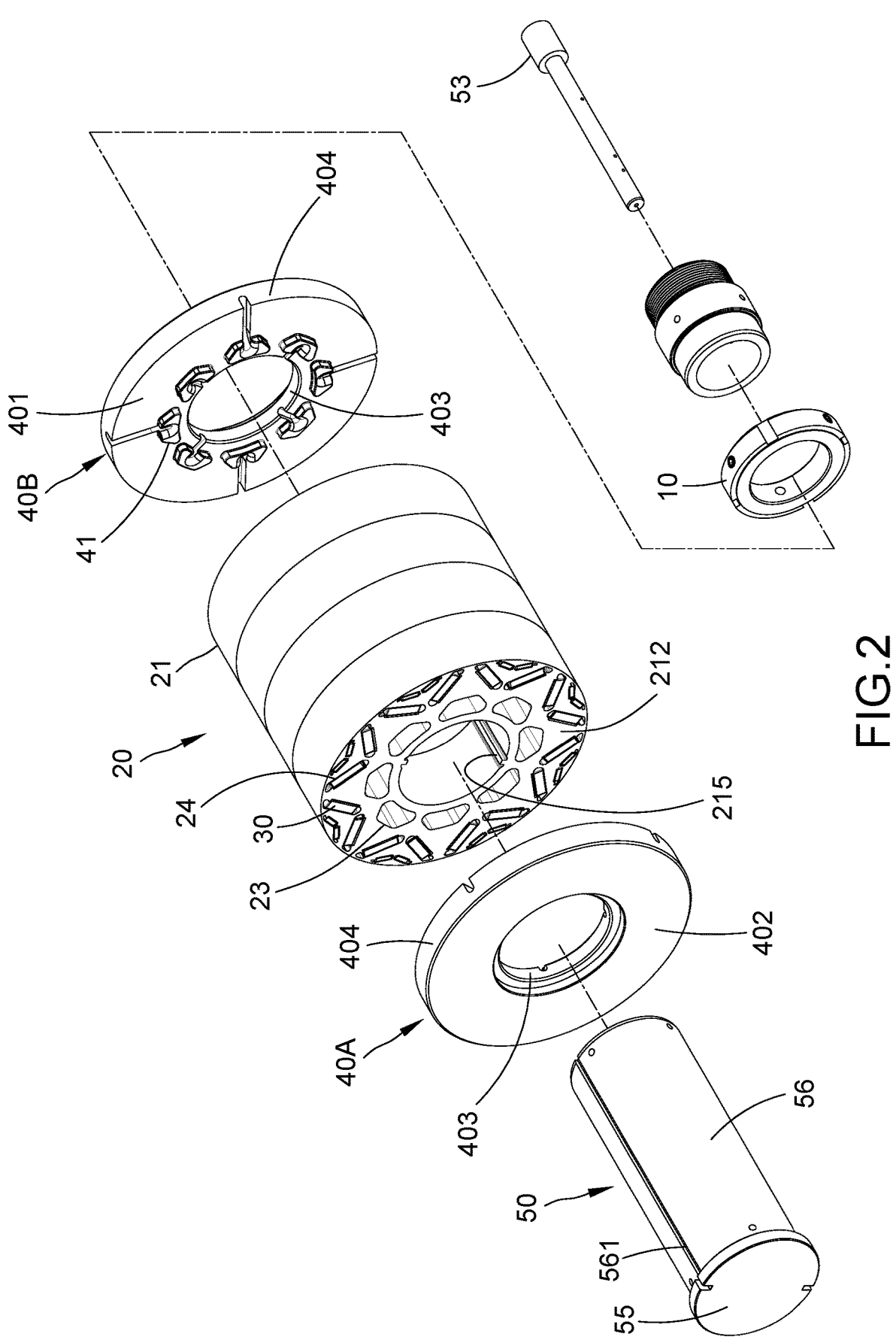
FIG. 2 is an exploded view of the rotor structure.

In other embodiments, as shown in FIG. 2, the interior of the hollow shaft 50 is equipped with an oil duct 53, and the oil duct 53 has multiple oil guide holes 531 distributed along the axial direction, thereby providing directionality to the cooling fluid within the hollow shaft 50 and limiting the flow rate, reducing the instantaneous rotational speed generated by the rotor during rotation, which changes the fluid velocity of the oil entry.

In other embodiments, in addition to the structure described above, the junction between the side surface 411 and the end surface 412 of the guiding protrusion 41 may also be formed with a rounded chamfer 414. This allows the cooling fluid to flow smoothly along the junction as it is guided from the rotor core 20 to the ring cover 40A (40B).

In other embodiments, in addition to the structure described above, there may be an interval G between the outer contour formed by the side surface 411 of the guiding protrusion 41 and the contour of the lightening hole 23, see FIGS. 5 and 7 for specific structures. The infiltrated cooling fluid is blocked by the side surface 411 of the guiding protrusion 41 and reintroduced into the lightening hole 23 to keep the oil level within the flow channel stable. Since the pressures on both sides of the channel outlet 45B are more consistent, the oil outflow on both sides is improved so that the temperature of the rotor on both sides is more uniform.

In other embodiments, in addition to the structure described above, the junction between the radial groove 461 and the oil inlet groove 451 formed in the guiding protrusions 41 or the junction between the radial groove 462 and the oil outlet groove 452 formed in the guiding protrusions 41 may also be formed with a concave arcuate groove 471. This further reduces the radial flow velocity into/out of the radial groove 461 (the radial groove 462), prolongs the time that the cooling fluid remains in the lightening hole 23, and facilitates thorough heat exchange.

In other embodiments, as shown in FIG. 1, the number of core laminations 21 of the rotor core 20 is multiple, and the multiple core laminations 21 are stacked and positioned along the axial grooves 561 of the outer circumferential surface of the hollow shaft 50. This allows the corresponding lightening holes 23 to be stacked along the axial direction, forming multiple non-overlapping channels inside the rotor. However, the structure of the previous embodiment may also be a rotor core 20 composed of a single core lamination 21, with the horizontal inner surfaces 401 of the two ring covers 40A, 40B attached to the front side core face 211 and the rear side core face 212 of the core lamination 21, respectively.

In other embodiments, in addition to the structure described above, the core laminations 21 of different layers may be offset at equal angles along the circumferential direction, and the lightening holes 23 of the core laminations 21 may also be offset along the circumferential direction to form inclined flow channels of the axial cooling oil passages.

In this embodiment, the radial grooves 461 of the ring cover 40A connected to the same axial cooling oil passage are not on the same line as the radial grooves 462 of the ring cover 40B. However, in other embodiments, the radial grooves 461 (the inlet groove 451) of the ring cover 40A connected to the same axial cooling oil passage may also be aligned with the radial grooves 462 (the outlet groove 452) of the ring cover 40B.

What is claimed is:

1. A rotor structure comprising:
   at least one core lamination having a horizontal side and multiple perforations, wherein the perforations consist of multiple lightening holes and multiple magnet mounting holes, and each contour of the lightening holes is identical, equidistant from a center, and arranged at equal angles;
   two ring covers each having a horizontal inner surface contacting an outermost horizontal side of the core lamination, the horizontal inner surface having multiple guiding protrusions corresponding to the lightening holes one at a time, with an end surface forming one portion of a groove, some of the grooves having the other portion forming a channel inlet located on an inner circumferential surface of the ring covers, while the other portion of the other grooves forming a channel outlet located on an outer circumferential surface of the ring covers, the channel inlet and the channel outlet being staggered around a circumferential direction; and
   a hollow shaft where the core lamination and the two ring covers are mounted on an outside of the hollow shaft, and the channel inlet of the ring covers is fluidly connected to an oil injection hole on the hollow shaft, wherein the guiding protrusions enter an inside of the lightening holes with respect to the horizontal inner surface.

2. The rotor structure according to claim 1, wherein an interior of the hollow shaft is provided with an oil duct having multiple oil guide holes distributed along an axial direction.

3. The rotor structure according to claim 1, wherein a junction between a side surface and the end surface of the guide protrusions is formed with a rounded chamfer.

4. The rotor structure according to claim 1, wherein the outer contour of the guide protrusions is spaced from contour of the lightening holes.

5. The rotor structure according to claim 1, wherein the other portion of the grooves forms a radial groove relative to the horizontal inner surface.

6. The rotor structure according to claim 5, wherein the junction between the radial groove and the grooves formed on the guiding protrusions is an arcuate groove.

7. The rotor structure according to claim 1, wherein a portion of a side surface of the guiding protrusions facing the hollow shaft has an arc extending in the circumferential direction.

* * * * *